May 30, 1933.   W. WAIT   1,911,413
METALLIC COLUMN AND GIRDER
Filed Feb. 28, 1930   2 Sheets-Sheet 1
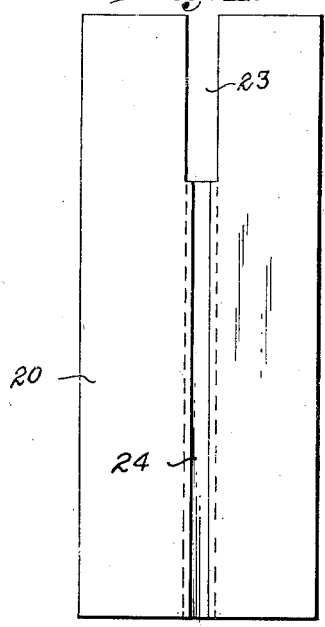
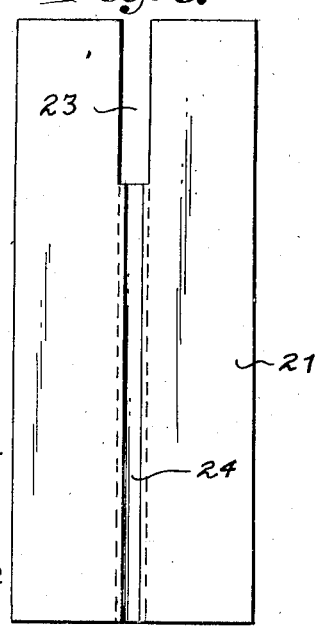
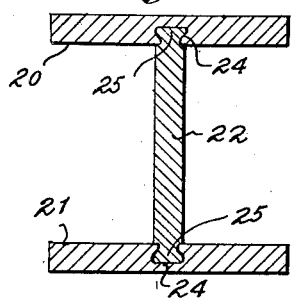
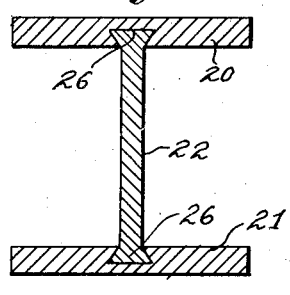
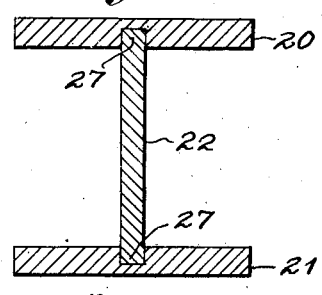
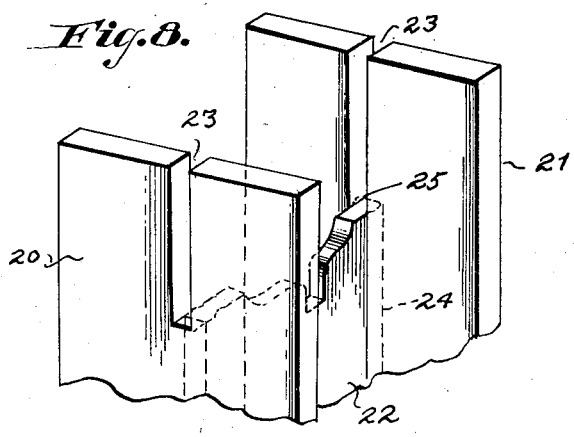
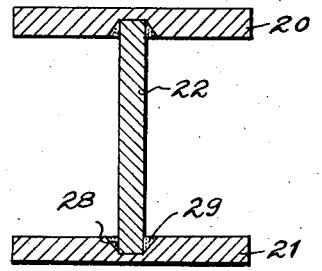
INVENTOR.
W. Wait
BY J. T. Newton
ATTORNEY.

May 30, 1933.　　　　　W. WAIT　　　　　1,911,413
METALLIC COLUMN AND GIRDER
Filed Feb. 28, 1930　　　2 Sheets-Sheet 2
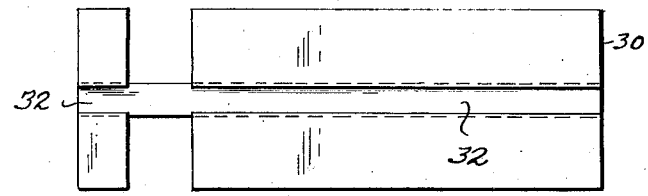
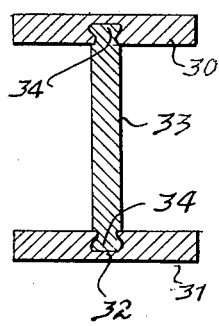
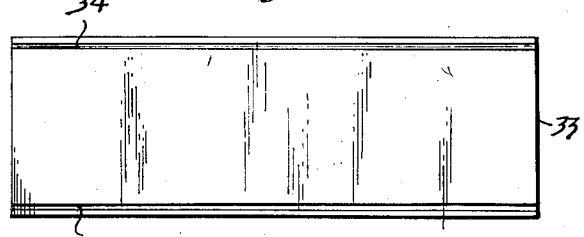
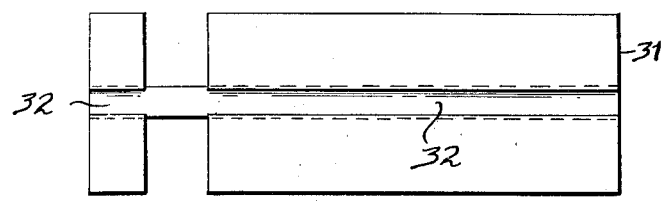
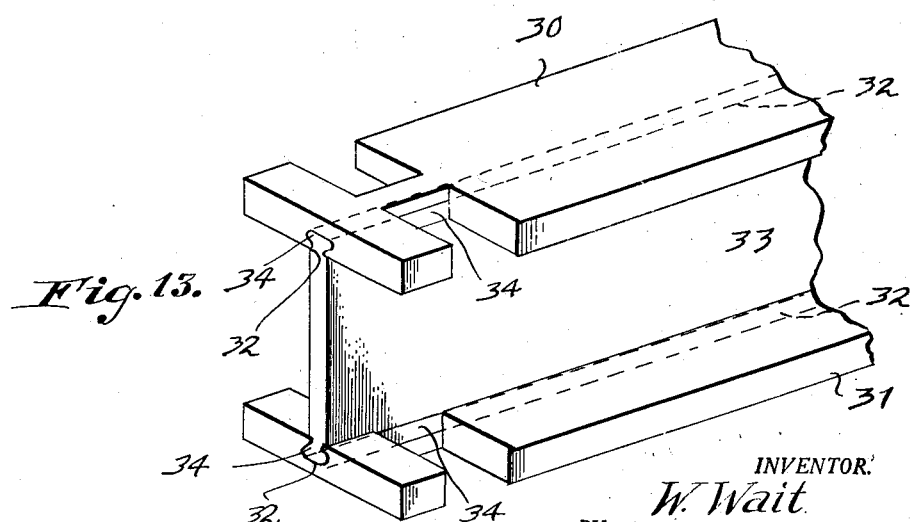
INVENTOR.
W. Wait
BY J. T. Newton
ATTORNEY Patented May 30, 1933

1,911,413

UNITED STATES PATENT OFFICE

WESLEY WAIT, OF NEWBURGH, NEW YORK

METALLIC COLUMN AND GIRDER

Application filed February 28, 1930. Serial No. 432,216.

This invention relates to improvements in metallic columns and girders of the H and I-beam type. In several patents previously granted to me, Nos. 1,662,728 and 1,662,767, of March 13, 1928, and No. 1,688,949, of October 23, 1928, are disclosed interlocking joints for structural material of this type. In fabricating the solid beams to provide the interlocking joints, the operation was found to be difficult and expensive, owing to the laborious work required in handling the heavy material and the trouble experienced in operating machines to cut and remove certain parts of the metal in shaping the beam ends to form the interlocking joints. To avoid this expense and difficulty, in the instant invention it is proposed to provide a built-up column or girder formed of a web and two flange members separately formed and welded together to form a composite beam. Previous to the welding, each of the component parts is separately fabricated to provide the interlocking joint when the parts are subsequently welded together. As the individual parts are much lighter than the solid beam, they can be handled more easily and as they are of flat material, they can be machined to a much better advantage, for in the solid beam certain parts are so difficult of access that it is extremely difficult to employ a machine to cut and remove the metal necessary for the formation of the joint structure.

In the drawings, in which similar reference characters designate corresponding parts, Figures 1—8 illustrate the formation of a column section, and Figures 9—13 illustrate the formation of a girder section. Figures 1, 2 and 3 show plan views of two flange members and a web member of the column section, these several parts being disjointed. Figure 4 is a cross-section of the complete column section, showing the preferred form of the joint connecting the web with the flange members. Figures 5—7 are cross-sections of columns with modified forms of the joint connecting the web and flange members. Figure 8 is a perspective view of an end of the column section, showing the formation for the interlocking joint. Figures 9—11 show plan views of two flange members and the web member of a girder section. Figure 12 is a cross-section of the girder section. Figure 13 is a perspective view of an end of the girder section, showing the formation for the interlocking joint.

Referring to the drawings in detail and more particularly to Figures 1—8, the column section illustrated therein comprises the flange members 20 and 21, respectively, and the web member 22, which are separately fabricated and subsequently welded together to form the composite beam. Each of the flange members is formed of a blank that is of the same superficial area as either flange member of the completed beam. The blank has a uniform thickness throughout. Entering one end of each of the flange members is a longitudinal slot 23 extending part way of the length of the member. Extending from the slot to the other end of each member is the groove 24, the slot and groove extending along a median line of the member. As shown in Figure 4, the opposite walls of the groove are flared to form a dovetail mortise. The two flange members are counter-parts of each other, as shown in Figures 1 and 3.

The web member 22 is formed of a blank of uniform thickness and of the same shape as the web of the ultimate beam, except that the blank is somewhat wider. Both edges of the web member are shaped to form rounded tenons 25 thereon to fit, respectively, the grooves 24 of the flange members 20 and 21 oppositely positioned in parallel relation to each other. With the tenons of the web member seated in the mortise grooves of the flange members and welded therein, a practically solid beam is provided with an end shaped to form the interlock disclosed in my previous patents. Such an end is shown in Figure 8.

The preferred form of the tenon and mortise joint between the web and flange members is shown in Figure 4, but other forms may be employed to meet different requirements, as shown in Figures 5—7. As shown in Figure 4, the tenon 26 is in the form of a bead extending along the edge of the web member and the mortise is dovetailed to register with the tenon. In assembling the joint members, the tenon is slid into the mortise at one end and the two parts are welded together by the well-known practice. As shown in Figure 5, the tenons 26 are flared outwardly to a greater width than the thickness of the web member 22 and the mortises are correspondingly shaped. This joint tends to brace the connection between the web member and the flange members. In Figure 6 the tenon 27 is a square extension of the web member and the mortise is likewise shaped. This simple joint is easily machined and is adapted to light beams. In Figure 7 is shown a joint similar to that shown in Figure 6, except that the mortise 28 is outwardly flared to receive a metal filling 29 in the welding and is employed in the construction of heavy beams.

A girder construction is disclosed in Figures 9—13. In this construction, as in the column construction previously described, the flange and web members are separately fabricated of flat blanks to include the individual features essential to the complete interlock of the girder. In each of the flange members 30 and 31 is formed the dovetail mortise 32 extending longitudinally of the member along a median line thereof. On the longitudinal edges of the web member 33 are formed the beaded tenons 34 to fit the dovetail mortises 32. With the flange and web assembled, the engaged joint parts are welded together to form a complete girder with the interlock formation in an end thereof, as shown in Figure 13. It is obvious that the different forms of joints shown in Figures 5—7 can be employed in the construction of the girder to meet different requirements.

While the main object in fabricating the web and flange members in separate parts is to simplify and cheapen the production of the interlock formation, yet another important object is accomplished. In rolling solid H-beams and other beams of this type, particularly so in the formation of the more massive material, the distortion of the metal forced into grooves of the rolls and through the slots of shaping devices tends to impair the fibre of the metal. Generally, the web is dense and compact from the direct pressure of the rolls, while the flanges are apt to be spongy in spots and segregation centers are frequent therein, owing to the distortion of the metal forming the flanges.

In the built-up beam of the instant invention the integrity of the fibre of the metal can be maintained. The flat blanks are passed between simple rolls and there is no excessive distortion of the metal, as in the formation of the solid beams. In the treatment of the flat material the density of the metal can be regulated throughout to meet the requirements and a uniformity in this respect can be imparted to both the web and flange members. Furthermore, in the formation of the solid beam there are limits to the thickness of the web and flanges, outside of which it is unsafe to venture. By forming the web and flanges separately, these parts may be given any thickness.

Having now described my invention, what I claim is:

1. A built-up metal column or girder of the H or I-beam type, comprising previously fabricated flange and web members in assembled relation, each of the flange members being a flat blank of uniform thickness throughout and having a groove extending longitudinally of the same in its inner face, and the web member welded at its longitudinal edges in the respective grooves of the opposite flange members.

2. A built-up metal column or girder of the H or I-beam type, comprising previously fabricated flange and web members in assembled relation, each of the flange members being a flat blank of uniform thickness throughout and having a groove extending longitudinally of the same in its inner face with the walls of the groove inwardly flared, and the web member having splayed tenons at its longitudinal edges welded in the respective grooves of the opposite flange members, said web member being flat and of uniform thickness throughout between the flange members.

3. A built-up metal column of the H or I-beam type, comprising previously fabricated flange and web members, a flange member having a notch in its upper portion and a groove extending longitudinally of the member on its inner face from the bottom of said notch to the other end of the flange member and a web member having a longitudinal edge fastened into said groove extending from the bottom of said notch.

4. A built-up metal girder of the H or I-beam type, comprising a previously fabricated flange member and web member in assembled relation, the flange member having a groove extending from end to end thereof and a web member fastened in said groove, said flange member having a notch near its end extending from the web member to the outer face of the flange member.

In testimony whereof I affix my signature.

WESLEY WAIT.